(12) United States Patent
Hirano et al.

(10) Patent No.: US 10,486,440 B2
(45) Date of Patent: Nov. 26, 2019

(54) TABLET PRINTING APPARATUS

(71) Applicant: SHIBAURA MECHATRONICS CORPORATION, Yokohama (JP)

(72) Inventors: Azusa Hirano, Yokohama (JP); Yasutsugu Tsuruoka, Yokohama (JP); Hironori Haijima, Yokohama (JP); Toru Kuribayashi, Yokohama (JP)

(73) Assignee: SHIBAURA MECHATRONICS CORPORATION, Yokohama-shi (JP)

( * ) Notice: Subject to any disclaimer, the term of this patent is extended or adjusted under 35 U.S.C. 154(b) by 0 days.

(21) Appl. No.: 16/017,397

(22) Filed: Jun. 25, 2018

(65) Prior Publication Data

US 2018/0370256 A1     Dec. 27, 2018

(30) Foreign Application Priority Data

Jun. 26, 2017 (JP) .................... 2017-124583
Jun. 1, 2018 (JP) .................... 2018-106062

(51) Int. Cl.
*A61J 3/00*    (2006.01)
*B41J 11/00*   (2006.01)

(52) U.S. Cl.
CPC ......... *B41J 11/0085* (2013.01); *B41J 11/007* (2013.01)

(58) Field of Classification Search
CPC ........ B41J 11/0085; B41J 3/407; A16J 3/007; B65H 5/224; A61J 3/007
See application file for complete search history.

(56) References Cited

U.S. PATENT DOCUMENTS

| 8,764,183 | B2 * | 7/2014 | Schaeffer | B41J 3/28 347/101 |
| 2004/0094050 | A1 * | 5/2004 | Ackley, Jr. | B23K 26/0838 101/44 |
| 2007/0194034 | A1 * | 8/2007 | Vasiadis | A61J 3/007 221/21 |
| 2018/0154659 | A1 * | 6/2018 | Ogimoto | A61J 3/06 |

FOREIGN PATENT DOCUMENTS

| JP | 07-081050 | 3/1995 |
| JP | 5281009 B2 | 9/2013 |
| JP | WO 2016/175259 A1 | 11/2016 |

* cited by examiner

*Primary Examiner* — Sharon A. Polk
(74) *Attorney, Agent, or Firm* — Oblon, McClelland, Maier & Neustadt, L.L.P.

(57) ABSTRACT

According to one embodiment, a tablet printing apparatus performs printing by using an inkjet print head device for a tablet conveyed by a conveying device. The conveying device includes a conveyor belt having a suction hole and configured to convey the tablet while sucking the tablet from the suction hole. The tablet printing apparatus further includes a rectifying board arranged at a distance from the conveyor belt so as to face a surface of the conveyor belt. The rectifying board has a gas permeability to let an airflow flowing toward the suction hole pass therethrough.

11 Claims, 7 Drawing Sheets

TABLET PRINTING APPARATUS

CROSS-REFERENCE TO THE RELATED APPLICATION

This application is based upon and claims the benefit of priority from Japanese Patent Applications No. 2017-124583, filed on Jun. 26, 2017 and No. 2018-106062, filed on Jun. 1, 2018; the entire contents of all of which are incorporated herein by reference.

FIELD

Embodiments described herein relate generally to a tablet printing apparatus.

BACKGROUND

A technique that uses an inkjet print head to preform printing is known for printing identification information such as characters, letters, marks or the like on a tablet. In a tablet printing apparatus using this technique, tablets are conveyed by a conveying device such as a conveyor. Ink (for example, edible ink) is ejected from a nozzle of the inkjet print head located above the conveying device toward each tablet passing under the print head to print identification information on the tablet. As a conveying device, a device that sucks and holds tablets on a conveyor belt has been developed. In the conveyor belt of the suction type conveying device, a plurality of suction holes are formed along the conveying direction of the tablets to suck and hold the tablets.

In the suction type conveying device, tablets supplied onto the suction holes of the conveyor belt are held on the conveyor belt by suction from the suction holes. However, there are cases where the suction hole is not completely closed by the tablet. A portion of the suction hole may not be closed depending on the size, shape, or the like of the tablet. Besides, the suction hole may not be closed at all due to random supply of the tablets. When the suction hole is not completely closed by the tablet, air is sucked from the suction hole, which causes turbulence. When turbulence occurs, the posture of the tablet held on the conveyor belt may change from a desired posture (for example, horizontal posture) due to the wind pressure. When the posture of the tablet changes from the desired posture, the ink ejected from the nozzle may land on a position other than a desired position on the tablet, resulting in reduced print quality.

DETAILED DESCRIPTION

According to one embodiment, a tablet printing apparatus performs printing by using an inkjet print head device for a tablet conveyed by a conveying device. The conveying device includes a conveyor belt having a suction hole and configured to convey the tablet while sucking the tablet from the suction hole.

The tablet printing apparatus further includes a rectifying board arranged at a distance from the conveyor belt so as to face a surface of the conveyor belt. The rectifying board has a gas permeability to let an airflow flowing toward the suction hole pass therethrough.

First Embodiment

A first embodiment will be described with reference to FIGS. 1 to 5. Incidentally, the terms "above" and "below" as used herein refer to "above" and "below" in the vertical direction. In addition, the "lower surface" of a conveyor belt 13a indicates the conveyor surface on which the tablets T are conveyed between points a and b in FIG. 1. The "upper surface" of a conveyor belt 21a indicates the conveyor surface on which the tablets T are conveyed between points c and d. The "curved surface" of a conveyor belt 21a indicates the conveyor surface on which the tablets T are conveyed between points d and e. The "lower surface" of a conveyor belt 21a indicates the conveyor surface on which tablets T are conveyed between points e and f. Further, the "upper surface" of a conveyor belt 31a indicates the conveyor surface on which the tablets T are conveyed between points g and h in FIG. 1. The "curved surface" of a conveyor belt 31a indicates the conveyor surface on which the tablets T are conveyed between points h and i. The "lower surface" of a conveyor belt 31a indicates the conveyor surface on which the tablets T are conveyed between points i and j.

(Basic Configuration)

Figure 1:
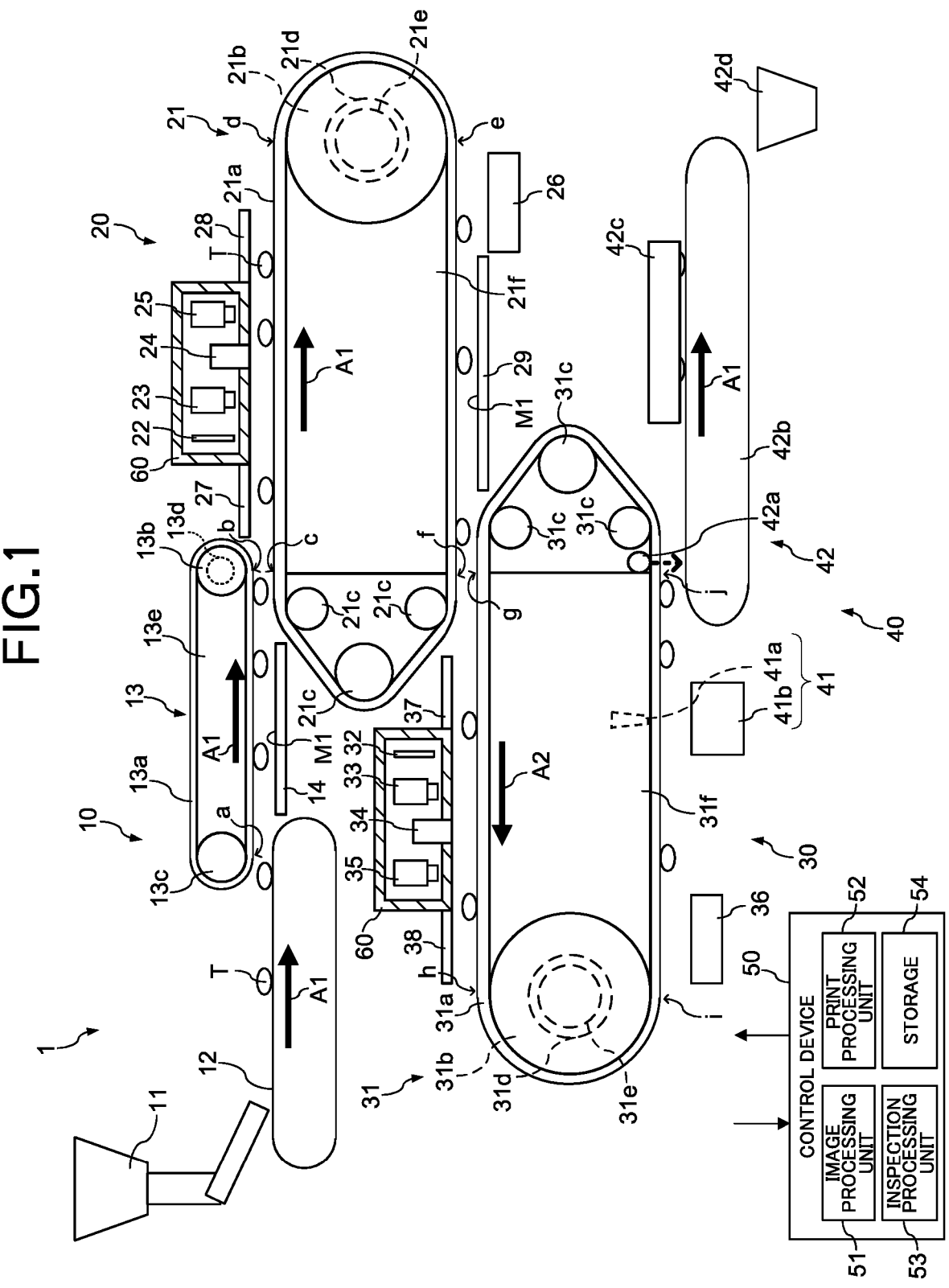
FIG. 1 is a diagram illustrating the schematic configuration of a tablet printing apparatus according to a first embodiment.

As illustrated in FIG. 1, a tablet printing apparatus 1 of the first embodiment includes a supply device (supplier) 10, a first printing device (printer) 20, a second printing device (printer) 30, a collecting device (collector) 40, and a control device (controller) 50. The first printing device 20 and the second printing device 30 basically have the same structure.

The supply device 10 includes a hopper 11, an alignment conveyor (alignment feeder) 12, and a relay conveyor (transfer feeder) 13. The supply device 10 is configured to be capable of supplying tablets T to be printed to the first printing device 20, and is located on one end side of the first printing device 20, i.e., on the upstream side in the conveying direction A1 of the tablets T (hereinafter simply referred to as "conveying direction A1"). The hopper stores a number of tablets T and sequentially supplies the tablets T to the alignment conveyor 12. The alignment conveyor 12 aligns the supplied tablets T in two rows and conveys them to the relay conveyor 13. The relay conveyor 13 sequentially sucks the tablets T aligned in two rows on the alignment conveyor 12 from above to hold them. The relay conveyor 13 conveys the tablets T in two rows to the first printing device 20 while holding them, and supplies them to the first printing device 20. The tablets T are hold against gravity when are sucked from above to hold them by the relay conveyor 13. Therefore, the suction force of the relay conveyor 13 is set so as not to drop the tablets T during the conveyance thereof. That is, the suction force of the relay conveyor 13 is set to be greater as compared to that of the conveyor which holds the tablets T by suction as supporting them from below. The supply device 10 is electrically connected to the control device 50, and is driven under the control of the control device 50. As the alignment conveyor 12 and the relay conveyor 13, for example, a belt conveying mechanism can be used.

The relay conveyor 13 includes a conveyor belt 13a, a driving pulley (pulley body) 13b, a driven pulley (pulley body) 13c, a motor (driving unit) 13d, and a suction chamber (suction unit) 13e. The conveyor belt 13a is an endless belt having a property to allow gas to pass therethrough, i.e., permeability to gas, and wrapped around the driving pulley 13b and the driven pulley 13c. The driving pulley 13b and the driven pulley 13c are rotatably provided to the apparatus main body, and the driving pulley 13b is connected to the motor 13d. The motor 13d is electrically connected to the control device 50, and is driven under the control of the control device 50. In the relay conveyor 13, the conveyor belt 13a is rotated together with the driven pulley 13c due to the rotation of the driving pulley 13b caused by the motor 13d, and the tablets T from the alignment conveyor 12 are held on the lower side of the conveyor belt 13a by the sucking action of the suction chamber 13e. The tablets T are conveyed in the direction of arrow A1 in FIG. 1 (conveying direction A1) as being held by the suction, and transferred to the first printing device at a position where the sucking action of the suction chamber 13e does not work.

Figure 2:
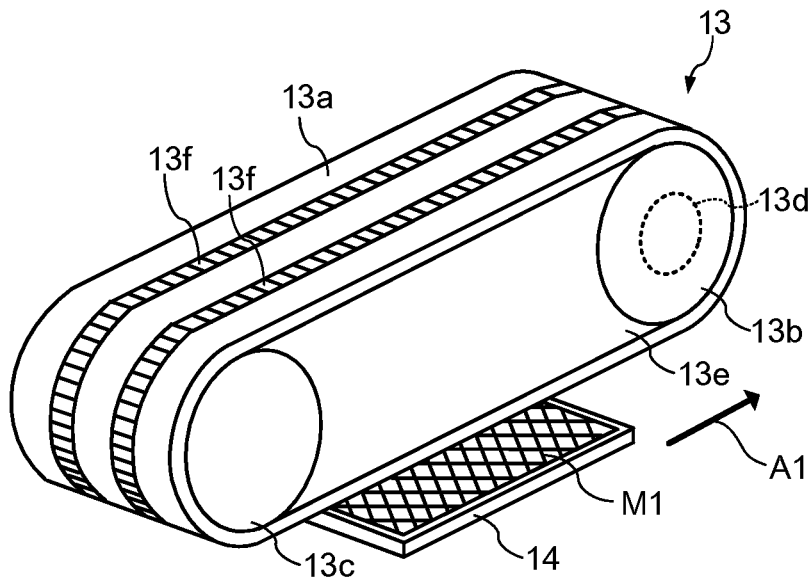
FIG. 2 is a perspective view illustrating a relay conveyor of the first embodiment.

As illustrated in FIG. 2, a plurality of rectangular suction holes 13f are formed on the surface of the conveyor belt 13a. The suction holes 13f are through holes for sucking and holding the tablets T, and are arranged in two rows, each in a ladder shape, in parallel along the conveying direction A1 so as to form two conveying paths (conveying routes). Each of the suction holes 13f is connected to the inside of the suction chamber 13e through a suction path (suction route) formed in the suction chamber 13e to obtain suction force from the suction chamber 13e. The suction chamber 13e is connected to a suction device (not illustrated) such as a pump through a suction pipe (not illustrated), and the inside of the suction chamber 13e is depressurized by the operation of the suction device. The suction pipe is connected to substantially the center of a side surface (a surface parallel to the conveying direction A1) of the suction chamber 13e. The suction device is electrically connected to the control device 50, and is driven under the control of the control device 50.

As illustrated in FIGS. 1 and 2, a rectifying board 14 having a gas permeability is arranged below the relay conveyor 13. The rectifying board 14 is located at a predetermined distance from the conveying path where the tablets T are conveyed by the relay conveyor 13, i.e., the conveyor surface on the lower side of the relay conveyor 13 (the lower surface of the conveyor belt 13a), and is arranged horizontally so as to face the conveyor surface. The predetermined distance is longer than the thickness of the tablet T (for example, 2 mm to 4 mm), and falls within a range in which the airflow generated by the suction of the suction chamber 13e of the relay conveyor 13 can be rectified (for example, 5 mm to 12 mm). The rectifying board 14 is provided at a position where the airflow generated by the suction of the suction chamber 13e passes through to rectify the airflow generated below and around the lower surface of the conveyor belt 13a. The rectifying board 14 is arranged to face the conveying paths in which the tablets T are sucked from above and conveyed in the relay conveyor 13, and also functions as a tray for receiving the tablets T falling from the lower surface of the conveyor belt 13a. That is, the rectifying board 14 has a receiving surface M1 for receiving the falling tablets T. The length of the rectifying board 14 in the width direction (the direction horizontally perpendicular to the conveying direction A1) is equal to or longer than the length of the conveyor belt 13a in the width direction (the direction horizontally perpendicular to the conveying direction A1). The length of the rectifying board 14 in the conveying direction A1 is shorter than the length of the relay conveyor 13 in the conveying direction A1. However, this is by way of example and not by way of limitation.

A mesh plate material is used as the rectifying board 14 having a gas permeability; however, it is not so limited. Various boards having a plurality of through holes, such as, for example, a punched board having a plurality of round holes, a board having a plurality of slit holes, and the like can be used. Besides, the rectifying board 14 may be made of a metal material such as SUS (stainless steel); however, it is not so limited, and any material may be used as long as it conforms to the Food Sanitation Law. Materials other than SUS, for example, aluminum or resin can also be used.

When the suction holes 13f in the lower surface of the conveyor belt 13a are not completely closed by the tablets T, air is sucked from the suction holes 13f in the lower surface of the conveyor belt 13a by the suction of the suction chamber 13e. As a result, an airflow flowing toward the suction holes 13f is generated below and around the lower surface of the conveyor belt 13a. However, the airflow is rectified as passing through the through holes of the rectifying board 14 and also weakened since some of the airflow is blocked by part of the rectifying board 14 other than the through holes. This suppresses the occurrence of turbulence. Thus, the tablet T held on the lower surface of the conveyor belt 13a can be made less likely to shift from its desired posture (for example, horizontal posture).

Referring back to FIG. 1, the first printing device 20 includes a conveying device (tablet conveying device (conveyor)) 21, a detecting device (detector) 22, a first imaging device (imaging device for printing (imager)) 23, a print head device (print head) 24, a second imaging device (imaging device for inspection (imager)) 25, and a drying device (drying equipment) 26.

The conveying device 21 includes a conveyor belt 21a, a driving pulley (pulley body) 21b, a plurality of driven pulleys (pulley bodies) 21c (three in the example of FIG. 1), a motor (driving unit) 21d, a position detector 21e, and a suction chamber (suction equipment) 21f. The conveyor belt 21a is an endless belt having a gas permeability, and wrapped around the driving pulley 21b and each of the driven pulleys 21c. The driving pulley 21b and the driven pulleys 21c are rotatably provided to the apparatus main body, and the driving pulley 21b is connected to the motor 21d. The motor 21d is electrically connected to the control device 50, and is driven under the control of the control device 50. The position detector 21e is a device such as an encoder and is attached to the motor 21d. The position detector 21e is electrically connected to the control device 50, and sends a detection signal to the control device 50. The control device 50 can obtain information such as the position, speed, and movement amount of the conveyor belt 21a based on the detection signal. In the conveying device 21, the conveyor belt 21a is rotated together with the driven pulleys 21c due to the rotation of the driving pulley 21b caused by the motor 21d, and the tablets T on the conveyor belt 21a are conveyed in the direction of arrow A1 in FIG. 1 (conveying direction A1).

Figure 3:
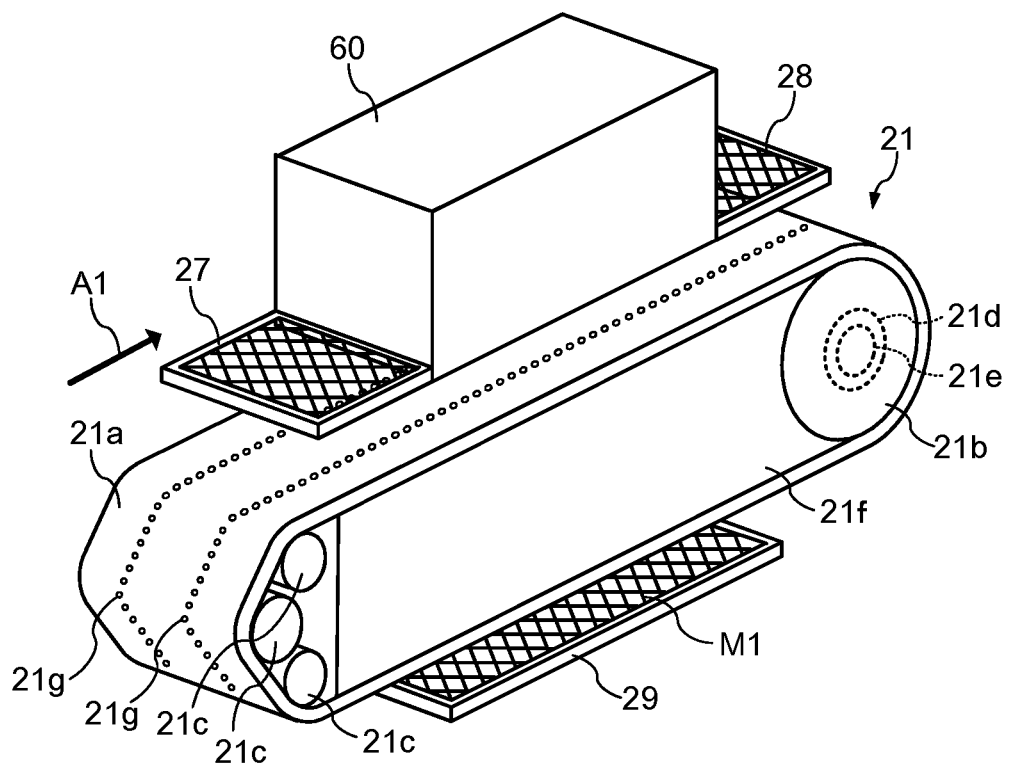
FIG. 3 is a perspective view illustrating a first printing device of the first embodiment.
Figure 4:
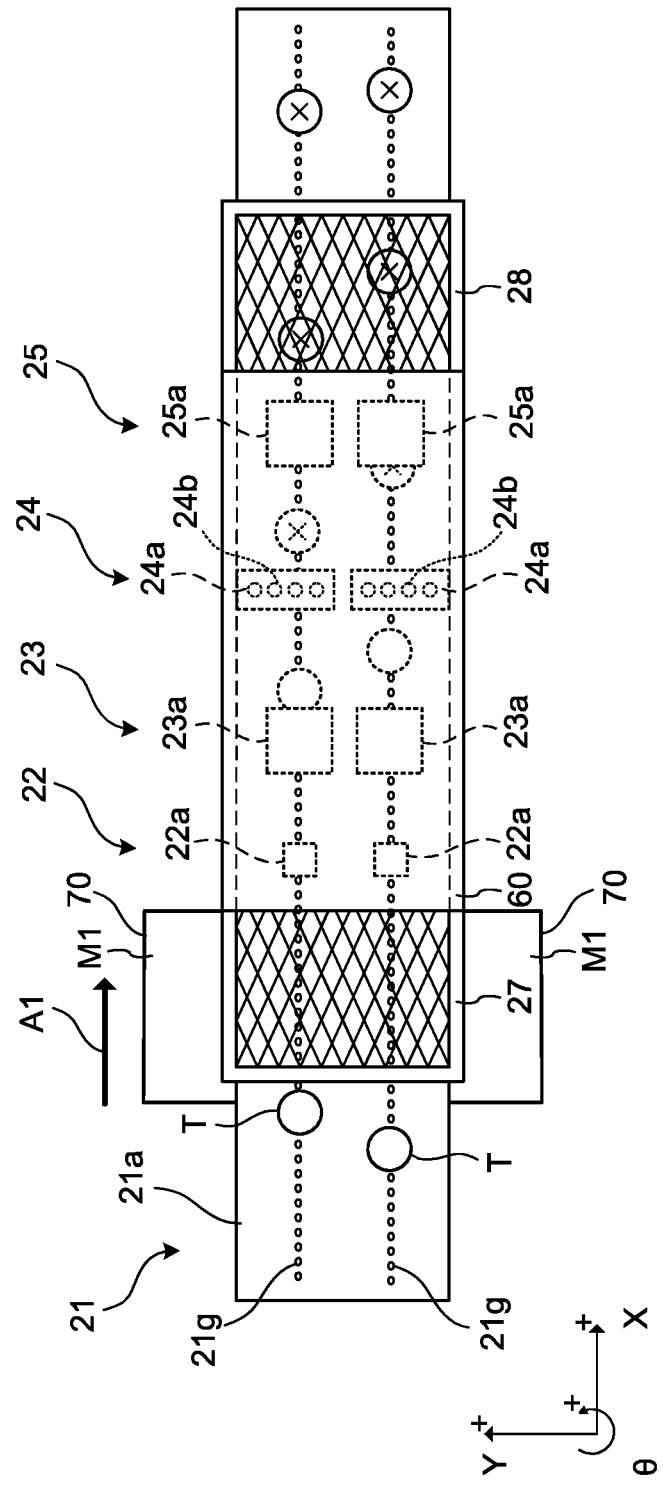
FIG. 4 is a plan view illustrating the first printing device of the first embodiment.

As illustrated in FIGS. 3 and 4, a plurality of circular suction holes 21g are formed on the surface of the conveyor belt 21a. The suction holes 21g are through holes for sucking and holding the tablets T, and are arranged in two rows in parallel along the conveying direction A1 so as to form two conveying paths. Each of the suction holes 21g is connected to the inside of the suction chamber 21f through a suction path formed in the suction chamber 21f to obtain suction force from the suction chamber 21f. The suction chamber 21f is connected to a suction device (not illustrated) such as a pump through a suction pipe (not illustrated), and the inside of the suction chamber 21f is depressurized by the operation of the suction device. The suction pipe is connected to substantially the center of a side surface (a surface parallel to the conveying direction A1) of the suction chamber 21f. The suction device is electrically connected to the control device 50, and is driven under the control of the control device 50.

As illustrated in FIG. 4, the detecting device 22 includes a plurality of detectors 22a (two in the example of FIG. 4). The detectors 22a are located on the downstream side of the position where the tablet T is supplied by the supply device 10 on the conveyor belt 21a in the conveying direction A1. The detectors 22a are arranged in a direction crossing the conveying direction A1 (for example, a direction perpendicular to the conveying direction A1) in the horizontal plane, one for each conveying path of the tablets T, and located above the upper surface of the conveyor belt 21a. Each of the detectors 22a detects the position (the position in the conveying direction A1) of the tablet T on the conveyor belt 21a by projecting and receiving laser beams, and functions as a trigger sensor of each device located on the downstream side. As the detectors 22a, various laser sensors such as reflection laser sensors can be used. Each of the detectors 22a is electrically connected to the control device 50, and sends a detection signal to the control device 50.

The first imaging device 23 includes a plurality of imaging units (imagers) 23a (two in the example of FIG. 4). The imaging units 23a are located on the downstream side of the position where the detecting device 22 is located in the conveying direction A1. The imaging units 23a are arranged in a direction crossing the conveying direction A1 (for example, a direction perpendicular to the conveying direction A1) in the horizontal plane, one for each conveying path of the tablets T, and located above the upper surface of the conveyor belt 21a. Each of the imaging units 23a performs imaging at the time when the tablet T reaches just under the imaging unit 23a based on the position information of the tablet T to capture an image (image for printing) including the upper surface of the tablet T, and sends the image to the control device 50. As the imaging units 23a, various cameras having an imaging device such as a charge-coupled device (CCD) or a complementary metal-oxide semiconductor (CMOS) can be used. Each of the imaging units 23a is electrically connected to the control device 50, and is driven under the control of the control device 50. There may also be provided an illumination for imaging as necessary.

The print head device 24 includes a plurality of ink jet print heads 24a (two in the example of FIG. 4. The print heads 24a are located on the downstream side of the position where the first imaging device 23 is located in the conveying direction A1. The print heads 24a are arranged in a direction crossing the conveying direction A1 (for example, a direction perpendicular to the conveying direction A1) in the horizontal plane, one for each conveying path of the tablets T, and located above the upper surface of the conveyor belt 21a. Each of the print heads 24a has a plurality of nozzles 24b (see FIG. 4: only four nozzles are illustrated in the figure), and ejects ink from the nozzles 24b individually. Each of the print heads 24a is arranged such that the alignment direction of the nozzles 24b intersects (for example, perpendicularly to) the conveying direction A1 in the horizontal plane. As the print heads 24a, various ink jet print heads having a drive element such as a piezoelectric element, a heating element, a magnetostrictive element or the like can be used. Each of the print heads 24a is electrically connected to the control device 50, and is driven under the control of the control device 50.

The second imaging device 25 includes a plurality of imaging units (imagers) 25a (two in the example of FIG. 4). The imaging units 25a are located on the downstream side of the position where the print head device 24 is located in the conveying direction A1. The imaging units 25a are arranged in a direction crossing the conveying direction A1 (for example, a direction perpendicular to the conveying direction A1) in the horizontal plane, one for each conveying path of the tablets T, and located above the upper surface of the conveyor belt 21a. Each of the imaging units 25a performs imaging at the time when the tablet T reaches just under the imaging unit 25a based on the position information of the tablet T to capture an image (image for inspection) including the upper surface of the tablet T, and sends the image to the control device 50. Similarly to the imaging units 23a, various cameras having an imaging device such as CCD or CMOS can be used as the imaging units 25a. Each of the imaging units 25a is electrically connected to the control device 50, and is driven under the control of the control device 50. There may also be provided an illumination for imaging as necessary.

Figure 5:
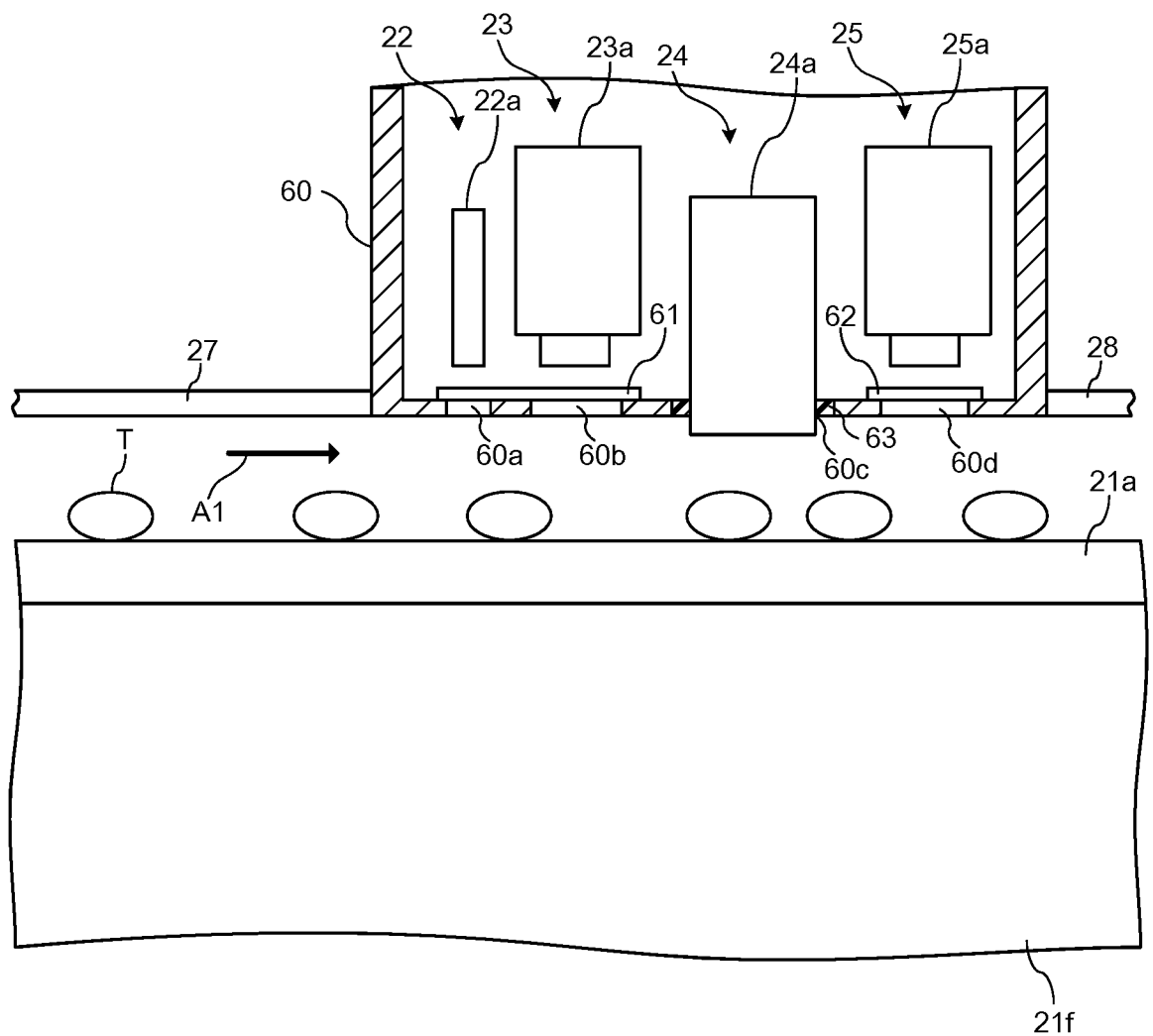
FIG. 5 is a diagram illustrating a part of the first printing device of the first embodiment.

As illustrated in FIGS. 3 to 5, the above-described devices 22 to 25 are covered with a cover 60. The cover 60 is a housing that houses the detecting device 22 (the two detectors 22a), the first imaging device 23 (the two imaging units 23a), the print head device 24 (the two print heads 24a), and the second imaging device 25 (the two imaging units 25a). The cover 60 is arranged above the upper surface of the conveyor belt 21a at a predetermined distance (for example, 2 mm to 4 mm) from the upper surface of the conveyor belt 21a according to the thickness of the tablet T (for example, 5 mm to 12 mm) to prevent its lower surface from contacting the tablets T conveyed by the conveyor belt 21a.

As illustrated in FIG. 5, two through holes 60a are formed in the lower surface of the cover 60 to be aligned in a direction perpendicular to the conveying direction A1 in the horizontal plane so that each of the detectors 22a in the cover 60 can detect the tablets T on the conveyor belt 21a. Besides, two through holes 60b are also formed in the lower surface of the cover 60 to be aligned in the same direction as the direction in which the through holes 60a are arranged so that each of the imaging units 23a in the cover 60 can capture images of the tablets T on the conveyor belt 21a. In addition, two through holes 60c are also formed in the lower surface of the cover 60 to be aligned in the same direction as the direction in which the through holes 60a are arranged so that each of the print heads 24a in the cover 60 can perform printing on the tablets T on the conveyor belt 21a. Further, two through holes 60d are also formed in the lower surface of the cover 60 to be aligned in the same direction as the direction in which the through holes 60a are arranged so that each of the imaging units 25a in the cover 60 can capture images of the tablets T on the conveyor belt 21a.

Each of the through holes 60a, 60b, and 60d is closed with translucent members 61 and 62 such as glassware provided on the bottom of the inside of the cover 60. In addition, each of the through holes 60c is closed by the print head 24a that is inserted therein via a sealing member 63 made of silicon or the like. Thus, the cover 60 is formed in a sealed state and the inside of the cover 60 is maintained at a positive pressure.

As illustrated in FIGS. 3 to 5, two rectifying boards 27 and 28 having a gas permeability are arranged on the sides of the cover 60. The rectifying board 27 is attached to the lower edge of the side surface of the cover 60 on the upstream side in the conveying direction A1. The rectifying board 28 is attached to the lower edge of the side surface of the cover 60 on the downstream side in the conveying direction A1. The rectifying boards 27 and 28 are each located at a predetermined distance from the conveying path where the tablets T are conveyed by the conveying device 21, i.e., the conveyor surface on the upper side of the conveying device 21 (the upper surface of the conveyor belt 21a), and arranged horizontally so as to face the conveyor surface. The predetermined distance is longer than the thickness of the tablet T (for example, 2 mm to 4 mm), and falls within a range in which the airflow generated by the suction of the suction chamber 21f of the conveying device 21 can be rectified (for example, 5 mm to 12 mm). The rectifying boards 27 and 28 are each provided at a position where the airflow generated by the suction of the suction chamber 21f passes through to rectify the airflow generated above and around the upper surface of the conveyor belt 21a. The length of each of the rectifying boards 27 and 28 in the width direction is equal to or longer than the length of the conveyor belt 21a in the width direction. The length of each of the rectifying boards 27 and 28 in the conveying direction A1 is shorter than the length of the conveying device 21 in the conveying direction A1.

A mesh plate material is used as the rectifying boards 27 and 28 having a gas permeability; however, it is not so limited. Various boards having a plurality of through holes, such as, for example, a punched board having a plurality of round holes, a board having a plurality of slit holes, and the like can be used. Besides, the rectifying boards 27 and 28 may be made of a metal material such as SUS; however, it is not so limited, and any material may be used as long as it conforms to the Food Sanitation Law. Materials other than SUS, for example, aluminum or resin can also be used.

When the suction holes 21g in the upper surface of the conveyor belt 21a are not completely closed by the tablets T, air is sucked from the suction holes 21g in the upper surface of the conveyor belt 21a by the suction of the suction chamber 21f. As a result, an airflow flowing toward the suction holes 21g is generated above and around the upper surface of the conveyor belt 21a. However, the airflow is rectified as passing through the through holes of the rectifying boards 27 and 28, and also weakened since some of the airflow is blocked by part of the rectifying boards 27 and 28 other than the through holes. This suppresses the occurrence of turbulence. Thus, the tablet T held on the upper surface of the conveyor belt 21a can be made less likely to shift from its desired posture (for example, horizontal posture). Since the distance between the upper surface of the conveyor belt 21a and the lower surface of the cover 60 is as short as, for example, 5 mm to 12 mm, the airflow flowing into this space tends to be strong (the flow velocity tends to be high). This airflow is rectified and weakened by the rectifying boards 27 and 28. Thereby, the occurrence of turbulence is suppressed. Thus, the posture of the tablet T held on the upper surface of the conveyor belt 21a can be reliably prevented from changing from the desired posture. The desired posture refers to a posture in which the ink ejected from the nozzles 24b can land on a desired position on the tablet T (a posture not causing a printing failure on the tablet T) (the same applies to others).

Referring back to FIG. 1, the drying device 26 is located on the downstream side of the position where the second imaging device 25 located in the conveying direction A1, and is arranged, for example, below the conveying device 21. The drying device 26 is shared in the two conveying paths, and is configured to dry the ink applied to each tablet T on the conveyor belt 21a. As the drying device 26, various types of dryers such as a blower for drying an object to be dried with air, a heater for drying an object to be dried by radiation heat, a blower for drying an object to be dried with worm air or hot air by using air and a heater, and the like can be used. The drying device 26 is electrically connected to the control device 50, and is driven under the control of the control device 50.

The tablet T passing above the drying device 26 is conveyed along with the movement of the conveyor belt 21a and reaches a position near the end of the conveyor belt 21a on the driven pulleys 21c side. At this position, the sucking action does not work on the tablet T. The tablet T is released from the hold of the conveyor belt 21a, and is transferred from the first printing device 20 to the second printing device 30.

As illustrated in FIGS. 1 and 3, a rectifying board 29 having a gas permeability is arranged below the conveying device 21. The rectifying board 29 is located at a predetermined distance from the conveying path where the tablets T are conveyed by the conveying device 21, i.e., the conveyor surface on the lower side of the conveying device 21 (the lower surface of the conveyor belt 21a), and is arranged horizontally so as to face the conveyor surface. The predetermined distance is longer than the thickness of the tablet T (for example, 2 mm to 4 mm), and falls within a range in which the airflow generated by the suction of the suction chamber 21f of the conveying device 21 can be rectified (for example, 5 mm to 12 mm). The rectifying board 29 is provided at a position where the airflow generated by the suction of the suction chamber 21f passes through to rectify the airflow generated below and around the lower surface of the conveyor belt 21a. The rectifying board 29 is arranged to face the conveying paths in which the tablets T are sucked from above and conveyed in the conveying device 21. The tablets T are hold against gravity when are sucked from above to hold them by the relay conveyor 21. Therefore, the rectifying board 29 also functions as a tray for receiving the tablets T falling from the lower surface of the conveyor belt 21a. That is, the rectifying board 29 has a receiving surface M1 for receiving the falling tablets T. The length of the rectifying board 29 in the width direction is equal to or longer than the length of the conveyor belt 21a in the width direction. The length of the rectifying board 29 in the conveying direction A1 is shorter than the length of the conveying device 21 in the conveying direction A1. However, this is by way of example and not by way of limitation.

Although the rectifying board 29 is arranged horizontally in the example of FIGS. 1 and 3, it may be inclined. In this case, the rectifying board 29 may be arranged to face the conveying paths in which the tablets T are conveyed as being sucked from above such that the tablets T move like sliding along the inclined rectifying board 29 to be received by a tray arranged around the end of the rectifying board 29.

A mesh plate material is used as the rectifying board 29 having a gas permeability; however, it is not so limited. Various boards having a plurality of through holes, such as, for example, a punched board having a plurality of round holes, a board having a plurality of slit holes, and the like can be used. Besides, the rectifying board 29 may be made of a metal material such as SUS (stainless steel); however, it is not so limited, and any material may be used as long as it conforms to the Food Sanitation Law. Materials other than SUS, for example, aluminum or resin can also be used.

When the suction holes 21g in the lower surface of the conveyor belt 21a are not completely closed by the tablets T, air is sucked from the suction holes 21g in the lower surface of the conveyor belt 21a by the suction of the suction chamber 21f. As a result, an airflow flowing toward the suction holes 21g is generated below and around the lower surface of the conveyor belt 21a. However, the airflow is rectified as passing through the through holes of the rectifying board 29 and also weakened since some of the airflow is blocked by part of the rectifying board 29 other than the through holes. This suppresses the occurrence of turbulence. Thus, the tablet T held on the lower surface of the conveyor belt 21a can be made less likely to shift from its desired posture (for example, horizontal posture). With this, the tablets T can be prevented from falling as being not sucked due to being displaced. It is also possible to prevent a printing failure caused because the tablets T cannot be detected due to the deviation of the position where the tablets T are transferred to the second printing device 30. Besides, when the tablet T to be printed has a curved surface and the curved surface is sucked at the time of conveyance, the area to be sucked and held is smaller as compared to the one having a flat surface to be sucked, and the tablet T is likely to roll over. Even in the case of conveying the tablet T having such a curved surface, if the occurrence of turbulence is suppressed, the tablet T can be made less likely to shake on the conveyor belt 21a due to the wind pressure of the turbulence. Thereby, the tablets T can be conveyed while the position and posture thereof are kept stable. Accordingly, it is possible to reduce printing failure due to the deviation of the print position on the tablet T to which printing is applied by the first printing device 20. Thus, decrease in productivity can be suppressed.

Referring back to FIG. 1, the second printing device 30 includes a conveying device (conveyor) 31, a detecting device (detector) 32, a first imaging device (imaging device for printing (imager)) 33, a print head device (print head) 34, a second imaging device (imaging device for inspection (imager)) 35, and a drying device (drying equipment) 36. The conveying device 31 includes a conveyor belt 31a, a driving pulley (pulley body) 31b, a plurality of driven pulleys (pulley bodies) 31c (three in the example of FIG. 1), a motor (driving unit) 31d, a position detector 31e, and a suction chamber (suction equipment) 31f. The devices 32 to 35 are housed in the cover 60. The cover 60 is provided with two rectifying boards 37 and 38. Each constituent element of the second printing device 30 has basically the same structure as the corresponding constituent element of the first printing device 20 described above. Therefore, the explanation will be omitted. In FIG. 1, arrow A2 indicates the conveying direction of the second printing device 30 (conveying direction A2).

The collecting device 40 includes a defective product collecting device 41 and a non-defective product collecting device 42. The collecting device 40 is located on the downstream side of the position where the drying device 36 of the second printing device 30 is located in the conveying direction A2. The collecting device 40 collects defective tablets T by the defective product collecting device 41 and collects good tablets T by the non-defective product collecting device 42.

The defective product collecting device 41 includes an injection nozzle 41a and a container 41b. The injection nozzle 41a is provided in the suction chamber 31f of the second printing device 30. The injection nozzle 41a injects a gas (for example, air) toward the tablet T (defective tablet T) conveyed by the conveyor belt 31a to drop the tablet T from the conveyor belt 31a. At this time, the gas injected from the injection nozzle 41a passes through the suction holes (similar to the suction holes 21g illustrated in FIGS. 3 and 4) of the conveyor belt 31a and hits the tablet T. The injection nozzle 41a is electrically connected to the control device 50, and is driven under the control of the control device 50. The container 41b receives and stores the tablet T dropped from the conveyor belt 31a.

The non-defective product collecting device 42 includes a gas blower 42a, a discharge conveyor (discharge feeder) 42b, a drying device 42c, and a container 42d. The non-defective product collecting device 42 is located on the downstream side of the position where the defective product collecting device 41 is located in the conveying direction A2.

The gas blower 42a is arranged at the end of the conveying device 31 in the conveying device 31 of the second printing device 30, that is, at the end of the conveyor belt 31a on the driven pulleys 31c side. During the printing process, for example, the gas blower 42a constantly blows a gas (for example, air) toward the conveyor belt 31a to drop the tablet T from the conveyor belt 31a. At this time, the gas blown out from the gas blower 42a passes through the suction holes (similar to the suction holes 21g illustrated in FIGS. 3 and 4) of the conveyor belt 31a and hits the tablet T. Examples of the gas blower 42a include an air blower having a slit-shaped opening extending in a direction crossing the conveying direction A2 in the horizontal plane (for example, a direction perpendicular to the conveying direction A2). The gas blower 42a is electrically connected to the control device 50, and is driven under the control of the control device 50.

The tablet T having passed through the defective product collecting device 41 is conveyed along with the movement of the conveyor belt 31a, and reaches a position near the end of the conveyor belt 31a on the driven pulleys 31c side. At this position, the sucking action does not work on the tablet T. However, with the gas blower 42a, the tablet T can be reliably dropped from the conveyor belt 31a and supplied to the discharge conveyor 42b.

The discharge conveyor 42b receives the tablet T dropped from the lower surface of the conveyor belt 31a and conveys it to the container 42d. For example, a belt conveyor mechanism can be used as the discharge conveyor 42b. The discharge conveyor 42b is electrically connected to the control device 50, and is driven under the control of the control device 50.

The drying device 42c is located above the discharge conveyor 42b. In addition to the drying devices 26 and 36, the drying device 42c is provided to dry the ink applied to each of the tablets T. As the drying device 42c, various types of dryers such as a blower for drying an object to be dried with air, a heater for drying an object to be dried by radiation heat, a blower for drying an object to be dried with worm air or hot air by using air and a heater, and the like can be used.

The drying device 42c is electrically connected to the control device 50, and is driven under the control of the control device 50.

Described below is an example of the drying device 42c that performs drying by air. The housing of the air-blow drying device 42c is formed to have a U-shaped cross section so as to cover the discharge conveyor 42b with an opening on its lower surface. An air nozzle is arranged in the housing of the drying device 42c to blow out air. The air nozzle is configured to blow air toward the conveyor surface on the upper side of the discharge conveyor 42b. The air flows along the conveyor surface of the discharge conveyor 42b toward the upstream end and the downstream end of the discharge conveyor 42b. The air nozzle may be in any form. For example, the air nozzle may include one or more pipes having a plurality of openings in the longitudinal direction thereof and blowing air through the openings. The openings are arranged to align in the longitudinal direction of the pipe. The pipe(s) may be arranged such that the longitudinal direction thereof is along the conveying direction A1 or crosses (for example, perpendicularly to) the conveying direction A1.

The container 42d is located at the end of the discharge conveyor 42b on the downstream side, i.e., at the end of the discharge conveyor 42b on the opposite side of the second conveying device 31, outside the housing of the tablet printing apparatus 1. The container 42d receives the tablets T having the ink dried by the drying device 42c from the discharge conveyor 42b and stores them.

The control device 50 includes an image processing unit (image processer) 51, a print processing unit (print processer) 52, an inspection processing unit (inspection processer) 53, and a storage 54. The image processing unit 51 processes an image. The print processing unit 52 performs processing related to printing. The inspection processing unit 53 performs processing related to inspection. The storage 54 stores various information such as processing information and various programs. The control device 50 controls the supply device 10, the first printing device 20, and the second printing device 30. The control device 50 receives position information of the tablets T sent from each of the detecting devices 22 and 32 of the first printing device 20 and the second printing device 30, images sent from each of the imaging devices 23, 25, 33 of the first printing device 20 and the second printing device 30, and the like.

(Printing Process)

Next, a description will be given of printing process and inspection process performed by the tablet printing apparatus 1.

First, various information such as print data required for printing is stored in the storage 54 of the control device 50. Then, a number of tablets T to be printed are put in the hopper 11 of the supply device 10. The tablets T are sequentially supplied from the hopper 11 to the alignment conveyor 12, and moved as being aligned in two rows by the alignment conveyor 12. The relay conveyor 13 sequentially supplies the tablets T moving in two rows to the conveyor belt 21a of the first printing device 20. At this time, each of the tablets T is transferred from the relay conveyor 13 to the conveyor belt 21a with its posture unchanged. The conveyor belt 21a is rotating in the conveying direction A1 with the rotation of the driving pulley 21b and the driven pulleys 21c caused by the motor 21d. Accordingly, the tablets T supplied onto the conveyor belt 21a are conveyed at a predetermined moving speed in two rows on the conveyor belt 21a. The conveyor belt 31a is also rotated in the conveying direction A2 with the rotation of the driving pulley 31b and the driven pulleys 31c caused by the motor 31d.

Thereafter, the detecting device 22 detects each of the tablets T on the conveyor belt 21a. Thereby, position information (the position in the conveying direction A1) of the tablet T is acquired and fed to the control device 50. The position information of the tablet T is stored in the storage 54 and used for post-processing. Next, the first imaging device 23 captures an image of the tablet T on the conveyor belt 21a at the timing based on the position information of the tablet T, and sends the image to the control device 50. The image processing unit 51 generates position deviation information of the tablet T (for example, position deviation of the tablet T in the X direction, the Y direction, and the θ direction in FIG. 4) based on each image received from the first imaging device 23. The position deviation information is stored in the storage 54. The print processing unit sets printing conditions (ejection position and ejection speed of the ink, etc.) for the tablet T based on the position deviation information of the tablet T. The printing conditions are stored in the storage 54.

Subsequently, the print head device 24 performs printing on each of the tablets T on the conveyor belt 21a based on the printing conditions at the timing based on the position information of the tablet T, i.e., at the timing when the tablet T reaches below the print head device 24. In each of the print heads 24a of the print head device 24, ink is appropriately ejected from each of the nozzles 24b. Thus, identification information such as a letter (for example, alphabet, kana, number), a mark (for example, symbol or figure), or the like is printed on the upper surface of the tablet T.

The second imaging device 25 captures an image of the tablet T having the identification information printed thereon at the timing based on the position information of the tablet T, and sends the image to the control device 50. The image processing unit 51 generates print position information indicating the print position of the print pattern for each of the tablets T based on each image received from the second imaging device 25. The print position information is stored in the storage 54. The inspection processing unit 53 determines whether the print on the tablet T is acceptable based on the print position information, and print quality determination result information indicating the result of print quality determination is stored in the storage 54 for each tablet T. For example, it is determined whether the print pattern is printed at a predetermined position on the tablet T.

The tablet T after the inspection is conveyed along with the movement of the conveyor belt 21a and passes above the drying device 26. At this time, the drying device 26 dries the ink applied to the tablet T while the tablet T is passing above the drying device 26. The tablet T having the ink dried is conveyed with the movement of the conveyor belt 21a, and arrives in the vicinity of the end of the conveyor belt 21a on the driven pulleys 21c side. At this position, the sucking action no longer works on the tablet T. The tablet T is released from the hold of the conveyor belt 21a, and is transferred from the first printing device 20 to the second printing device 30.

After that, the second printing device 30 also performs the printing process and the inspection process in the same manner as described above. The tablet T after the inspection is conveyed with the movement of the conveyor belt 31a and passes above the drying device 36. Then, the tablet T with the ink dried reaches the defective product collecting device 41. The defective tablet T is dropped from the lower surface of the conveyor belt 31a by the gas ejected from the injection nozzle 41a and collected in the container 41b. On the other hand, the non-defective tablet T passes through the defective product collecting device 41, and reaches the non-defective product collecting device 42. At this position, the non-defective tablet T is dropped from the lower surface of the conveyor belt 31a, due to the sucking action no longer working on the tablet T and the blowing out the gas by the gas blower 42a, and is transferred to the discharge conveyor 42b. While the non-defective tablet T is being conveyed by the discharge conveyor 42b, the drying device 42c dries the ink on the tablet T completely. After the ink is dried, the tablet T is conveyed by the discharge conveyor to above the container 42d. The tablet T drops from the downstream end of the discharge conveyor 42b, and is collected in the container 42d.

During the printing process, in the relay conveyor 13, the tablets T are held on the lower surface of the conveyor belt 13a by suction from the suction holes 13f in the lower surface of the conveyor belt 13a. However, a portion of the suction hole 13f in the lower surface of the conveyor belt 13a may not be closed depending on the size, shape, or the like of the tablets T, or the suction hole 13f in the lower surface of the conveyor belt 13a may not be completely closed by the tablets T due to random supply of the tablets T. In this case, air is sucked from the suction holes 13f in the lower surface of the conveyor belt 13a. As a result, an airflow flowing toward the suction holes 13f is generated below and around the lower surface of the conveyor belt 13a. Even such an airflow is generated, the airflow generated below and around the lower surface of the conveyor belt 13a is rectified as passing through the through holes of the rectifying board 14 and also weakened since some of the airflow is blocked by part of the rectifying board 14 other than the through holes. This suppresses the occurrence of turbulence. Thus, each of the tablets T held on the lower surface of the conveyor belt 13a can be maintained in its desired posture. With this, the tablets T can be prevented from falling as being not sucked due to being displaced. It is also possible to prevent a printing failure caused because the tablets T cannot be detected due to the deviation of the position where the tablets T are transferred to the next conveying device 21. Thus, decrease in productivity can be suppressed. Besides, if the tablet T has shifted from its desired posture in the relay conveyor 13, the tablet T is not in its desired posture also in the first printing device 20 since the tablet T is transferred to the first printing device 20 with its posture unchanged. However, as described above, the tablet T can be maintained in its desired posture in the relay conveyor 13. Thereby, the tablet T can be supplied to the first printing device 20 as being in the desired posture.

In the conveying device 21 of the first printing device 20, each of the tablets T transferred from the relay conveyor 13 as its posture is being maintained is supplied onto the suction holes 21g in the upper surface of the conveyor belt 21a. The tablets T supplied from the relay conveyor 13 are held on the upper surface of the conveyor belt 21a by suction from the suction holes 21g in the upper surface of the conveyor belt 21a. However, a portion of the suction hole 21g in the upper surface of the conveyor belt 21a may not be closed depending on the size, shape, or the like of the tablets T, or the suction hole 21g in the upper surface of the conveyor belt 21a may not be completely closed by the tablets T due to random supply of the tablets T. In this case, air is sucked from the suction holes 21g in the upper surface of the conveyor belt 21a. As a result, an airflow flowing toward the suction holes 21g is generated above and around the upper surface of the conveyor belt 21a. Even such an airflow is generated, the airflow generated above and around the upper surface of the conveyor belt 21a is rectified as passing through the through holes of the rectifying boards 27 and 28, and also weakened since some of the airflow is blocked by part of the rectifying boards 27 and 28 other than the through holes. This suppresses the occurrence of turbulence. Further, since the distance between the upper surface of the conveyor belt 21a and the lower surface of the cover 60 (the surface facing the conveyor belt 21a) is as short as, for example, 5 mm to 12 mm, the airflow flowing into this space tends to be strong. However, this airflow is rectified and weakened by the rectifying boards 27 and 28. Thereby, the occurrence of turbulence is suppressed. Thus, each of the tablets T held on the upper surface of the conveyor belt 21a can be maintained in its desired posture. As a result, the ink ejected from the print head device 24 of the first printing device 20 lands on a desired position on the tablet T. Thus, decrease in print quality can be suppressed.

Further, in the conveying device 21 of the first printing device 20, the tablets T having undergone printing are moved to the lower surface of the conveyor belt 21a as being held on the conveyor belt 21a by suction from the suction holes 21g of the conveyor belt 21a. However, similarly to the above case, a portion of the suction hole 21g in the lower surface of the conveyor belt 21a may not be closed depending on the size, shape, or the like of the tablets T, or the suction hole 21g in the lower surface of the conveyor belt 21a may not be completely closed by the tablets T due to random supply of the tablets T. In this case, air is sucked from the suction holes 21g in the lower surface of the conveyor belt 21a. As a result, an airflow flowing toward the suction holes 21g is generated below and around the lower surface of the conveyor belt 21a. Even such an airflow is generated, the airflow generated below and around the lower surface of the conveyor belt 21a is rectified as passing through the through holes of the rectifying board 29 and also weakened since some of the airflow is blocked by part of the rectifying board 29 other than the through holes. This suppresses the occurrence of turbulence. Thus, each of the tablets T held on the lower surface of the conveyor belt 21a can be maintained in its desired posture. With this, the tablets T can be prevented from falling as being not sucked due to being displaced. It is also possible to prevent a printing failure caused because the tablets T cannot be detected due to the deviation of the position where the tablets T are transferred to the next conveying device 31. Thus, decrease in productivity can be suppressed. Besides, if the tablet T has shift from its desired posture in the first printing device 20, the tablet T is not in its desired posture also in the second printing device 30 since the tablet T is transferred to the second printing device 30 with its posture unchanged. However, as described above, the tablet T can be maintained in its desired posture in the first printing device 20. Thereby, the tablet T can be supplied to the second printing device 30 as being in the desired posture.

Also in the conveying device 31 of the second printing device 30, similarly to the above case, air is sucked from suction holes 31g in the upper surface of the conveyor belt 31a. As a result, an airflow flowing toward the suction holes 31g is generated above and around the upper surface of the conveyor belt 31a. Even such an airflow is generated, the airflow generated above and around the upper surface of the conveyor belt 31a is rectified as passing through the through holes of the rectifying boards 37 and 38, and also weakened since some of the airflow is blocked by part of the rectifying boards 37 and 38 other than the through holes. This suppresses the occurrence of turbulence. Further, since the distance between the upper surface of the conveyor belt 31a and the lower surface of the cover 60 is as short as, for example, 5 mm to 12 mm, the airflow flowing into this space tends to be strong. However, this airflow is rectified and weakened by the rectifying boards 37 and 38. Thereby, the occurrence of turbulence is suppressed. Thus, each of the tablets T held on the upper surface of the conveyor belt 31a can be maintained in its desired posture. As a result, the ink ejected from the print head device 34 of the second printing device 30 lands on a desired position on the tablet T. Thus, decrease in print quality can be suppressed.

For example, with respect to the number of tablets falling from the conveyor surface on the lower side of the relay conveyor 13, when 1000 tablets T were conveyed on the conveyor belt 13a without the rectifying board 14, 20 to 40 of them fell. At this time, printing failure (tablets in improper posture for printing on the conveyor belt 21a) occurred in about 80% of the tablets T. The same results were found with the provision of a rectifying board having no through hole. On the other hand, when 1000 tablets T were conveyed on the conveyor belt 13a after arranging, as the rectifying board 14, a mesh board (1 mm square mesh) having a plurality of through holes in the space between the alignment conveyor 12 and the conveying device 21 of the first printing device 20 so as to face the conveyor surface on the lower side of the relay conveyor 13, no tablet fell. In addition, the rate of printing failure (tablets in improper posture for printing on the conveyor belt 21a) decreased to 20% to 30%.

As described above, according to the first embodiment, the rectifying board having a gas permeability (for example, the rectifying board 14, the rectifying boards 27 and 28, the rectifying board 29, the rectifying boards 37 and 38) is arranged so as to face the conveying path at a distance from the conveying path, through which the tablets T are conveyed by the conveying device (for example, the relay conveyor 13, the conveying device 21, the conveying device 31). An airflow flowing toward the suction holes (for example, the suction holes 13f and 21g) is generated around the conveyor surface of the conveying device by suction of the conveying device. However, the airflow is rectified as passing through the through holes of the rectifying board, and also weakened since some of the airflow is blocked by part of the rectifying board other than the through holes. This suppresses the occurrence of turbulence. Thus, each of the tablets T conveyed by the conveying device can be maintained in its desired posture. As a result, the ink ejected from the print head device (for example, the print head device 24, the print head device 34) lands on a desired position on the tablet T. Thus, decrease in print quality can be suppressed. Further, since each of the tablets T conveyed by the conveying device is stably maintained in its desired posture, the tablets T can be prevented from falling as being not sucked due to being displaced. It is also possible to prevent a printing failure caused because the tablets T cannot be detected due to the deviation of the position where the tablets T are transferred to the next conveying device (21, 31). Besides, when the tablet T to be printed has a curved surface and the curved surface is sucked at the time of conveyance, the area to be sucked and held is smaller as compared to the one having a flat surface to be sucked, and the tablet T is likely to roll over. Even in the case of conveying the tablet T having such a curved surface, if the occurrence of turbulence is suppressed, the tablet T can be made less likely to shake on the conveyor belt 21a due to the wind pressure of the turbulence. Thereby, the tablets T can be conveyed while the position and posture thereof are kept stable. Accordingly, it is possible to reduce printing failure due to the deviation of the print position on the tablet T. Thus, decrease in productivity can be suppressed.

In addition, when the operation of the tablet printing apparatus 1 is stopped to clean the whole of the apparatus, by removing the cover 60, the rectifying boards 27 and 28 attached to the cover 60 can also be removed. With this, the cover 60 and the rectifying boards 27 and 28 can be cleaned at once. Thereby, the cleaning can be performed efficiently. In addition, since the detecting device 22, the first imaging device 23, and the second imaging device 25 are covered with the cover 60, and powder of the tablets T does not adhere to them, they do not need cleaning. Thus, the cleaning can be simplified.

Second Embodiment

Next, a second embodiment will be described with reference to FIGS. 6 and 7. The second embodiment is basically similar to the first embodiment except the number of rectifying boards. Therefore, the same description will not be repeated.

Figure 6:
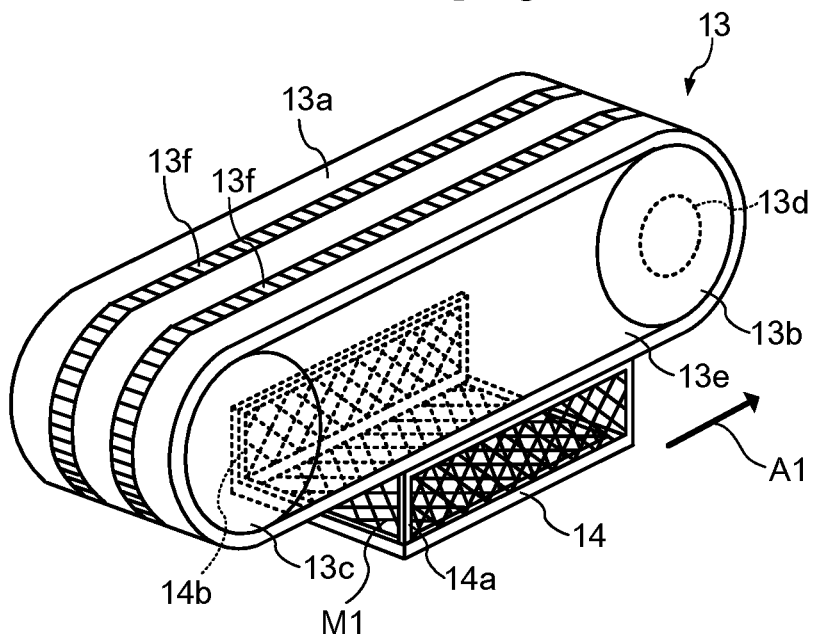
FIG. 6 is a perspective view illustrating a relay conveyor according to a second embodiment.

According to the second embodiment, as illustrated in FIG. 6, two rectifying boards 14a and 14b are provided to the relay conveyor 13 in addition to the rectifying board 14.

The two rectifying boards 14a and 14b are arranged so as to sandwich a space between the upper surface of the rectifying board 14 and the lower surface of the conveyor belt 13a in the width direction of the rectifying board 14 (a direction horizontally perpendicular to the conveying direction A1). The two rectifying boards 14a and 14b are arranged vertically, and spaced apart from each other by a predetermined distance. The predetermined distance is substantially the same as the length of the conveyor belt 13a in the width direction; however, it is not so limited. Further, although the rectifying boards 14a and 14b may be made of the same board or material as the rectifying board 14, it is not so limited. For example, the rectifying boards 14a and 14b may be made of a different type of plate or a different type of material than that of the rectifying board 14.

When the suction holes 13f in the lower surface of the conveyor belt 13a are not completely closed by the tablets T, air is sucked from the suction holes 13f in the lower surface of the conveyor belt 13a by the suction of the suction chamber 13e. As a result, an airflow flowing toward the suction holes 13f is generated below and around the lower surface of the conveyor belt 13a. However, the airflow is rectified as passing through the through holes of the rectifying boards 14, 14a, and 14b, and also weakened since some of the airflow is blocked by part of the rectifying boards 14, 14a, and 14b other than the through holes. Thus, the tablet T held on the lower surface of the conveyor belt 13a can be reliably prevented from shifting out of its desired posture (for example, horizontal posture).

Figure 7:
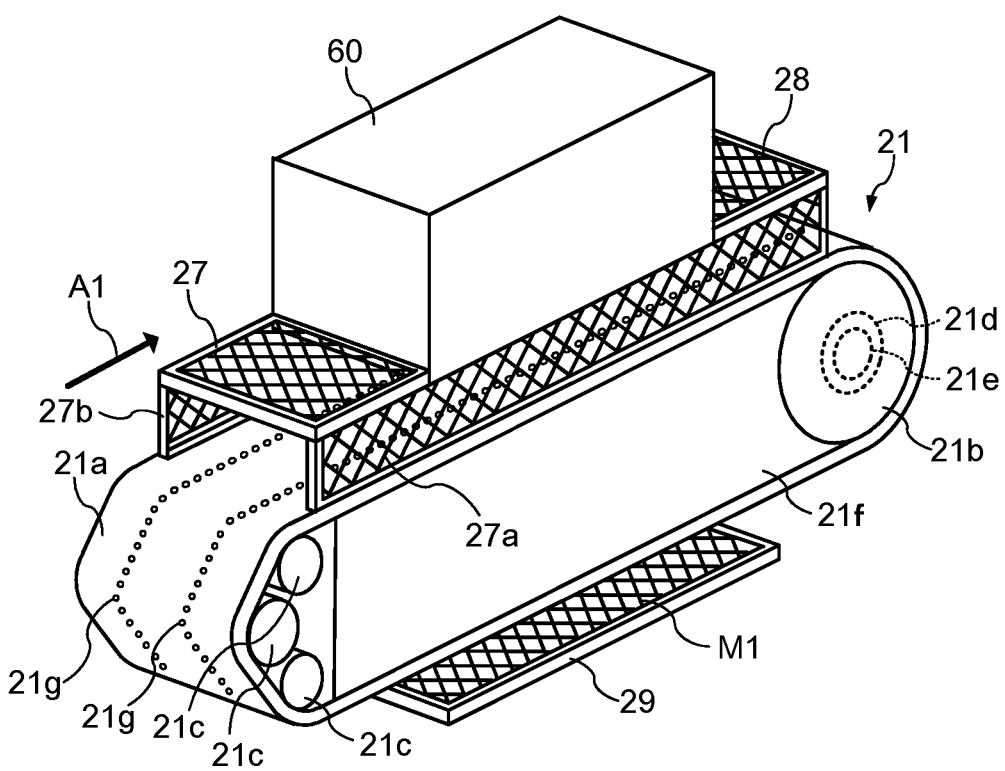
FIG. 7 is a perspective view illustrating a first printing device of the second embodiment.

Further, as illustrated in FIG. 7, two rectifying boards 27a and 27b are arranged above the conveying device 21 of the first printing device 20 in addition to the two rectifying boards 27 and 28. Incidentally, there may be provided a rectifying board also below the conveying device 21 of the first printing device 20, i.e., also to the rectifying board 29.

The two rectifying boards 27a and 27b are arranged so as to sandwich a space between the lower surface of the rectifying board 27 and the upper surface of the conveyor belt 21a, a space between the lower surface of the cover 60 and the upper surface of the conveyor belt 21a, and a space between the lower surface of the rectifying board 28 and the upper surface of the conveyor belt 21a in the width direction of each of the rectifying boards 27 and 28 (a direction horizontally perpendicular to the conveying direction A1). The two rectifying boards 27a and 27b are arranged vertically, and spaced apart from each other by a predetermined distance. The predetermined distance is substantially the same as the length of the conveyor belt 21a in the width direction; however, it is not so limited. Further, although the rectifying boards 27a and 27b may be made of the same board or material as the rectifying boards 27 and 28, it is not so limited. For example, the rectifying boards 27a and 27b may be made of a different type of plate or a different type of material than that of the rectifying boards 27 and 28.

When the suction holes 21g in the upper surface of the conveyor belt 21a are not completely closed by the tablets T, air is sucked from the suction holes 21g in the upper surface of the conveyor belt 21a by the suction of the suction chamber 21f. As a result, an airflow flowing toward the suction holes 21g is generated above and around the upper surface of the conveyor belt 21a. However, the airflow is rectified as passing through the through holes of the rectifying boards 27, 28, 27a, and 27b, and also weakened since some of the airflow is blocked by part of the rectifying boards 27, 28, 27a, and 27b other than the through holes. Thus, the tablet T held on the upper surface of the conveyor belt 21a can be reliably prevented from shifting out of its desired posture (for example, horizontal posture).

As described above, according to the second embodiment, it is possible to achieve the same effects as those of the first embodiment. Further, in addition to the rectifying board 14, the two rectifying boards 27 and 28, and the rectifying board 29, there are provided the rectifying boards 14a, 14b, 27a and 27b. Although an airflow toward the suction holes (for example, the suction holes 13f, 21g) is generated around the conveyor surface of the conveying device by the suction of the conveying device (for example, the relay conveyor 13, the conveying device 21), the airflow is rectified as passing through the through holes of each of the rectifying boards (for example, the rectifying boards 14, 14a, 14b, 27, 27a, 27b, 28, 29), and also weakened since some of the airflow is blocked by part of the rectifying boards other than the through holes. This suppresses the occurrence of turbulence. Thereby, the tablet T conveyed by the conveying device can be reliably maintained in its desired posture. As a result, the ink ejected from the print head device (for example, the print head device 24) lands on a desired position on the tablet T. Thus, decrease in print quality can be reliably suppressed. Further, since the tablet T conveyed by the conveying device can be stably maintained in its desired posture, the tablet T can be prevented from falling as being not sucked due to being displaced. It is also possible to prevent a printing failure caused because the tablet T cannot be detected due to the deviation of the position where the tablet T is transferred to the next conveying device (21, 31). Besides, when the tablet T to be printed has a curved surface and the curved surface is sucked at the time of conveyance, the area to be sucked and held is smaller as compared to the one having a flat surface to be sucked, and the tablet T is likely to roll over. Even in the case of conveying the tablet T having such a curved surface, if the occurrence of turbulence is suppressed, the tablet T can be made less likely to shake on the conveyor belt (21a) due to the wind pressure. Thereby, the tablets T can be conveyed while the position and posture thereof are kept stable. Accordingly, it is possible to reduce printing failure due to the deviation of the print position on the tablet T. Thus, decrease in productivity can be suppressed.

Other Embodiments

Although the rectifying boards 14, 14a, 14b, 27, 27a, 27b, 28, 29, 37, and 38 are each described above as a flat plate, this is by way of example and not limitation. For example, each of the rectifying boards may be a curved plate.

In the above description, the two rectifying boards 27 and 28 are provided with respect to the cover 60; however, this is by way of example and not limitation. There need not necessarily be two rectifying boards. The number of rectifying boards may be one, three or more. Note that the surface of the conveyor belt 21a moves along the conveying direction A1 during the conveyance of the tablets T. Accordingly, without the rectifying boards 27 and 28, stronger turbulence may occur on the upstream side above the upper surface of the conveyor belt 21a as compared to the downstream side. Therefore, in the case of eliminating either one of the two rectifying boards 27 and 28, it is desirable to leave the upstream side rectifying board 27 and to eliminate the downstream side rectifying board 28. In addition, since printing is supposed to be finished on the downstream side of the cover 60 in the conveying direction A1 as the tablets T have already passed under the print head device, the posture of the tablets T may no longer matter. In this case also, the downstream side rectifying board 28 may be eliminated, leaving the upstream side rectifying board 27.

In the above description, the two rectifying boards 27 and 28 are provided to the cover 60 in a rectangular parallelepiped shape, one on each side thereof. That is, the rectifying boards 27 and 28 are provided, respectively, on the upstream side and the downstream side of the rectangular parallelepiped cover 60 in the conveying direction A1. However, this is by way of example and not limitation. For example, the rectifying boards 27 and 28 may be provided to the rectangular parallelepiped cover 60, one on each of the sides in parallel to the conveying direction A1, i.e., the two sides of the rectangular parallelepiped cover 60 facing each other in a direction perpendicular to the conveying direction A1. It is possible to change the positions of the rectifying boards 27 and 28 with respect to the sides of the cover 60.

While the two rectifying boards 14a, 14b and the two rectifying boards 27a, 27b are described above as being arranged vertically, this is by way of example and not limitation. For example, the rectifying boards may be inclined at a predetermined angle or arranged horizontally. If the two rectifying boards 14a, 14b and the two rectifying boards 27a, 27b are inclined or horizontally arranged, it is possible to rectify and weaken the airflow generated above the upper surface of the conveyor belt 21a, below the lower surface thereof, and around there.

While the cover 60 is described above as being formed in a sealed state, this is by way of example and not limitation. For example, a gap may be formed in the cover 60, or the upper portion of the cover 60 may be opened. In this case, it is desirable that the translucent members 61 and 62 of the cover 60 be each formed of a rectifying board having a gas permeability. Although there is an airflow flowing downward from the inside of the cover 60 toward the conveyor surface of the conveyor belt 21a, this makes it possible to change the airflow which flows from around to below the cover 60 to an airflow flowing downward, thereby rectifying it.

Although the detecting device 22, the first imaging device 23, the print head device 24, and the second imaging device 25 are described above as being housed in the cover 60, this is by way of example and not limitation. For example, if the adhesion of powder of the tablets T does not matter, the cover 60 may not be needed. When the cover 60 is not provided, a rectifying board having a gas permeability may be provided below the detecting device 22, the first imaging device 23, the print head device 24, and the second imaging device 25. The rectifying board is formed so as not to interfere with the operation of the detecting device 22, the first imaging device 23, the print head device 24, and the second imaging device 25.

While the rectifying board 29 is described above as being arranged below the conveying device 21, this is by way of example and not limitation. For example, a rectifying board may be provided below the conveying device 31. In this case, it is possible to prevent such a situation that the tablet T has been displaced and cannot be discharged upon the discharge of the tablet T in the defective product collecting device 41. Regarding the arrangement of the rectifying board, it may be arranged so as to cover the upper surface of the drying device 36 (the surface facing the conveyor belt 31a). In this case, the rectifying board is formed so as not to interfere with the air and heat radiated from the drying device 36 to the lower surface of the conveyor belt 31a, and is made of heat resistant material. Similarly, the rectifying board 29 may be arranged so as to cover the upper surface of the drying device 26 (the surface facing the conveyor belt 21a).

In the above description, the permeability volume of the rectifying boards 14, 14a, 14b, the rectifying boards 27, 27a, 27b, 28, the rectifying board 29, and the rectifying boards 37, 38 is not variable; however, this is by way of example and not limitation. The gas permeability volume of the rectifying boards may be variable. For example, two rectifying boards may be arranged in layers. In this case, the size of the through holes of the rectifying boards can be varied by sliding or rotating either or both of the rectifying boards so as to adjust the overlap of the through holes, thereby adjusting the gas permeability volume.

It suffices if the size of the through holes of the rectifying boards (for example, the rectifying boards 14, 14a, 14b, 27, 27a, 27b, 28, 29, 37, 38) is large enough to obtain gas permeability but small enough not to let the fallen tablet T slip therethrough. For example, it is only required that the diameter of the through holes be smaller than that of the tablets T.

Further, the gas permeability volume of the rectifying boards (for example, the rectifying boards 14, 14a, 14b, 27, 27a, 27b, 28, 29, 37, 38) may vary depending on their location. For example, as will be described later, if there are places where the suction force is strong and where the suction force is weak with respect to the tablets T on the conveyor belt 21a, rectifying boards each having different sized through holes may be installed depending on the places to vary the gas permeability volume. Alternatively, as described above, the gas permeability volume may be varied by moving either or both of the rectifying boards arranged in layers.

When the through holes formed in the rectifying board (for example, each of the rectifying boards 14, 14a, 14b, 27, 27a, 27b, 28, 29, 37, and 38) are round holes or slits, the hole axis can be perpendicular or inclined to the surface of the rectifying board. If the hole axis is set inclined, the inclination angle may be determined according to the airflow flowing toward the surface of the conveyor belt (21a, 31a).

The suction force of the suction chamber 21f is described above as being constant. However, this is by way of example and not limitation. For example, the inside of the suction chamber 21f may be divided into a plurality of sections (two or more sections) each assigned a different suction force, so that the suction force varies depending on the region of the conveyor belt 21a. As an example, assuming that the inside of the suction chamber 21f is divided into two sections, the suction force of the first section (the section connected to the suction holes 21g in the upper surface of the conveyor belt 21a) may be set to be weak, and the suction force of the second section (the section connected to the suction holes 21g in the lower surface and the surface (curved surface) connecting the upper surface and the lower surface of the conveyor belt 21a) may be set to be strong. In this case, the suction force of the suction holes 21g in the lower surface of the conveyor belt 21a is stronger than that of the suction holes 21g in the upper surface of the conveyor belt 21a. Accordingly, turbulence may occur below and around the lower surface of the conveyor belt 21a.

However, as the presence of the rectifying board suppresses the occurrence of turbulence below and around the lower surface of the conveyor belt 21a, the tablet T held on the lower surface of the conveyor belt 21a can be maintained in its desired posture. As a result, the ink ejected from the print head device lands on a desired position on the tablet T.

Thereby, decrease in print quality can be reliably suppressed. Further, since the tablet T conveyed by the conveyor belt 21a is stably maintained in a desired posture, the tablet T can be prevented from falling as being not sucked due to being displaced. It is also possible to prevent a printing failure caused because the tablet T cannot be detected due to the deviation of the position where the tablet T is transferred to the next conveying device 31. Thus, decrease in productivity can be suppressed. As in the above case, turbulence may occur also at the position of the driving pulley 21b. This is because the suction force is increased in the position of the driving pulley 21b to prevent the tablets T from being displaced due to the centrifugal force and the gravity. Therefore, a rectifying board may be provided so as to face the entire conveyor surface of the conveyor belt 21a which sucks and conveys the tablets T. The conveyor belt 31a and the driving pulley 31b may also be configured in the same manner.

Figure 8:
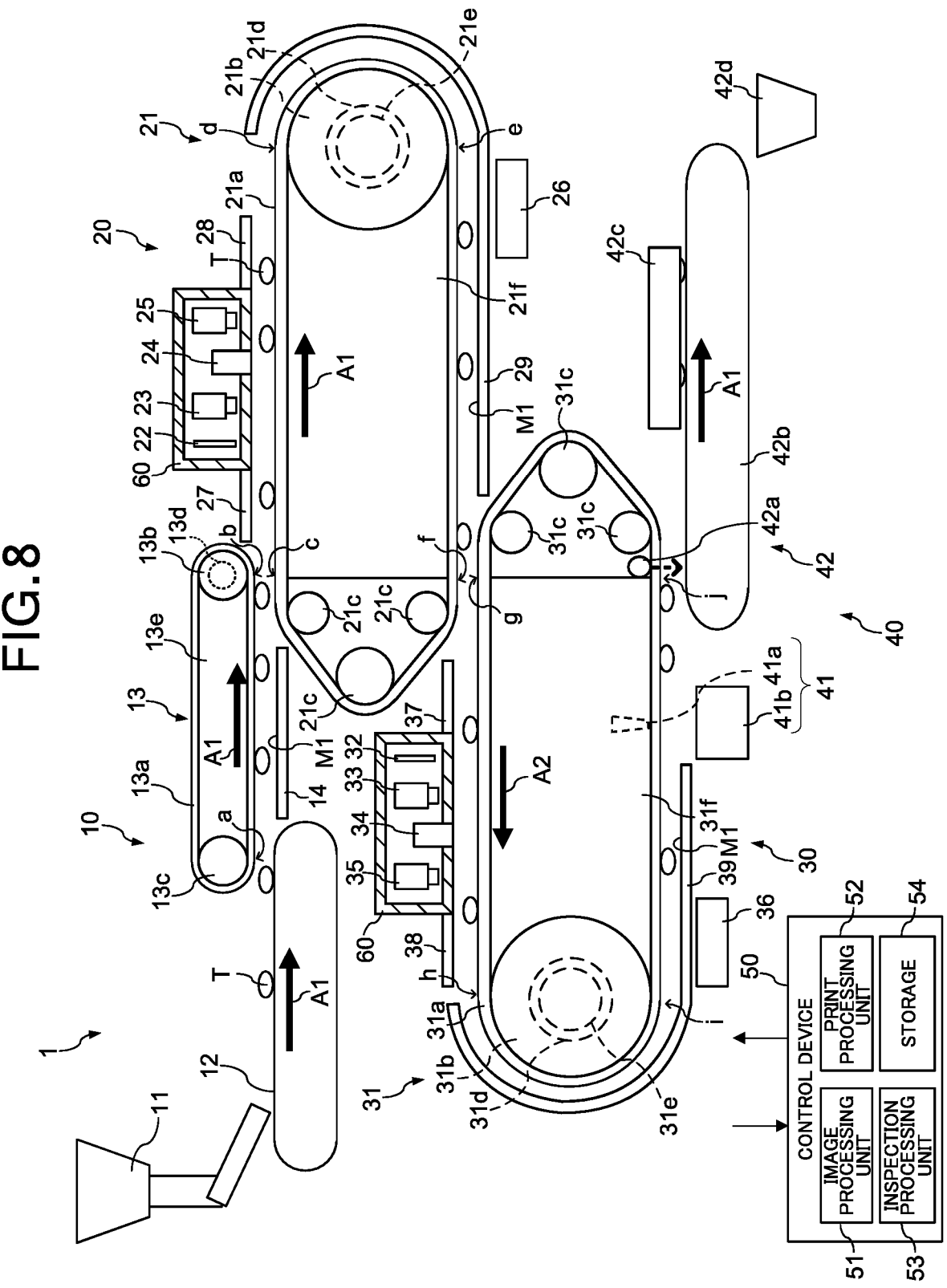
FIG. 8 is a diagram illustrating the schematic configuration of a tablet printing apparatus according to another embodiment.

For example, as illustrated in FIG. 8, the rectifying board 29 may have a similar shape along the outer peripheral surface of the driving pulley 21b in the position of the driving pulley 21b. With this, even if the suction force is increased in the position of the driving pulley 21b as described above, and a stronger airflow is generated toward the suction holes 21g, the airflow is rectified as passing through the through holes in the rectifying board 29, and also weakened since some of the airflow is blocked by part of the rectifying board 29 other than the through holes. This suppresses the occurrence of turbulence. At this time, the increased suction force may sometimes be decreased. However, the opening ratio of the holes of the rectifying board 29 can be set as appropriate so as to obtain the air volume (the amount of air sucked by the suction chamber 21f) capable of maintaining the suction force enough to suck and hold the tablets T.

In particular, at the time of starting the apparatus, at the time of restart after maintenance, or the like, when there were not many tablets T to be sucked and held, i.e., when many of the suction holes 21g were not closed by the tablets T, the number of fallen tablets was reduced by the use of the rectifying board 29 having a plurality of through holes provided near the outer periphery of the driving pulley 21b as compared to the case without the rectifying board 29. In this way, by providing the rectifying board 29 having a plurality of through holes, even if many of the suction holes 21g are not closed by the tablets T, it is possible to suppress the occurrence of turbulence as well as suppressing a decrease in the suction force. Thus, the tablets can be sucked and held stably.

The distance between the surface on the side of the conveyor belt 21*a* in the rectifying board 29 of the embodiment and the conveyance surface around the outer periphery of the driving pulley 21*b* may be any distance as long as the rectifying board 29 does not touch the tablets T and the suction force acting on the tablets T does not change. For example, the distance may be constant and unchanged.

Figure 9:
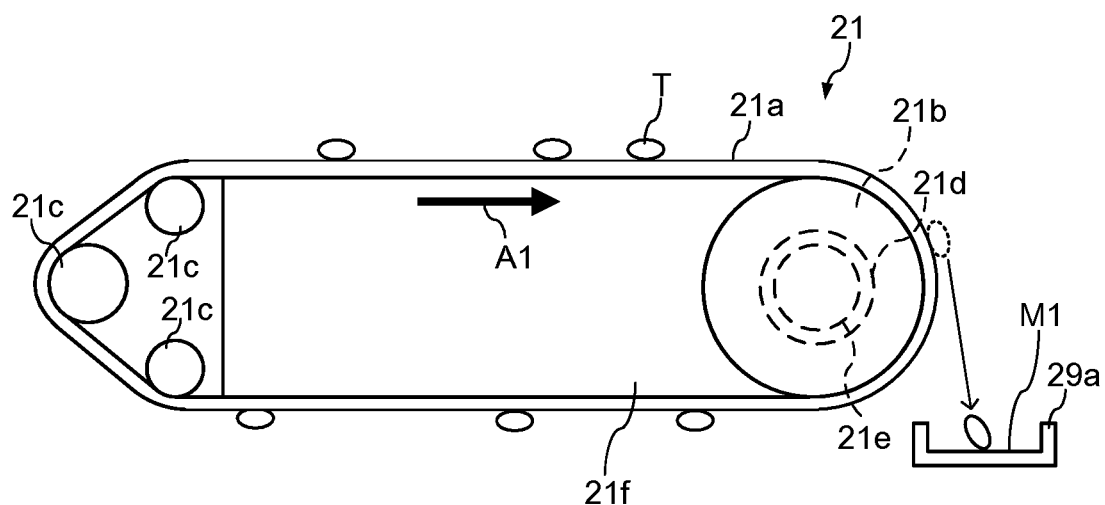
FIG. 9 is a diagram illustrating a part of a first printing device according to the other embodiment.
Figure 10:
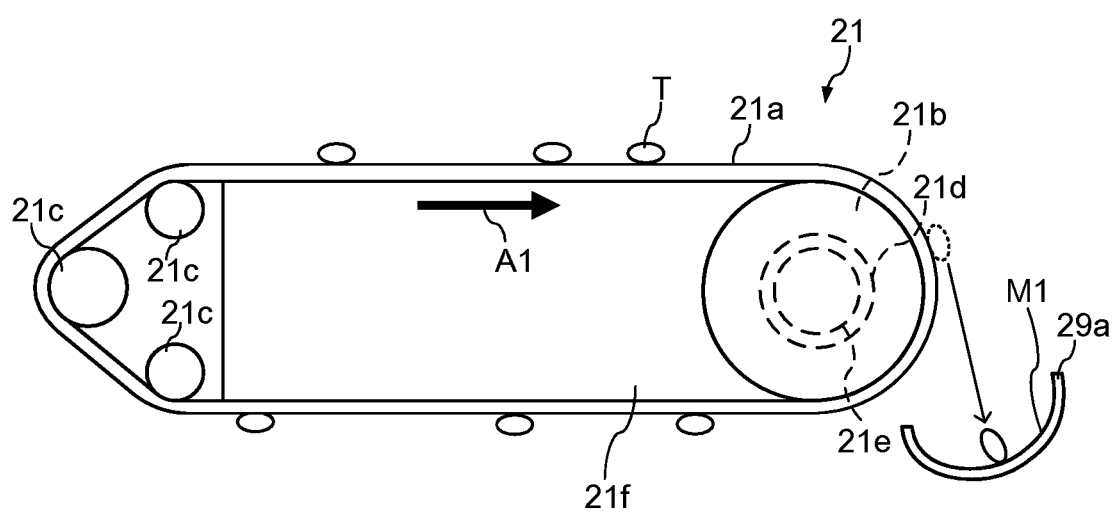
FIG. 10 is a diagram illustrating a part of a first printing device according to a modification of the other embodiment.

Besides, for example, as illustrated in FIGS. 9 and 10, a rectifying board 29*a* may be arranged at the position of the driving pulley 21*b*. In this case, the rectifying board 29*a* may have the receiving surface M1 for receiving the tablets T falling from the conveying path around the driving pulley 21*b*. The receiving surface M1 may be a flat surface as illustrated in FIG. 9 or a curved surface as illustrated in FIG. 10. The receiving surface M1 has a gas permeability similarly to the above-described rectifying boards (for example, the rectifying boards 14, 14*a*, 14*b*, 27, 27*a*, 27*b*, 28, 29, 37, and 38). With this, airflow around the driving pulley 21*b* is rectified, and the tablets T can be made less likely to shake. Thus, the tablets T can be stably maintained in their desired posture. Further, even if the tablets T are displaced and fall as not being sucked or fall due to insufficient suction force, the falling tablets T can be received. The periphery of the receiving surface M1 may be surrounded by a side surface. This side surface prevents the tablets T fallen on the receiving surface M1 from falling from the receiving surface M1.

As a result of the inventor's experiment, when the through holes of the rectifying board 29*a* as illustrated in FIGS. 9 and 10 were closed at the position of the driving pulley 21*b*, the number of fallen tablets increased as compared to the case where the through holes was not closed. That is, by providing the rectifying board 29 having a plurality of through holes, it is possible to catch the fallen tablets T and also to reduce the number of fallen tablets. The fallen tablets T received are collected separately from those subjected to printing, and can be prevented from mixing with them.

The tablets T are described above as being conveyed in two rows; however, this is by way of example and not limitation. The number of rows is not particularly limited, and there may be one row, three rows, or four or more rows. In addition, the shape of the suction holes (13*f*, 21*g*) of the conveyor belt (13*a*, 21*a*, 31*a*) is also not particularly limited.

The print head 24*a* is described as being provided for each conveying path of the tablets T; however, this is by way of example and not limitation. For example, printing on two or more rows of tablets T may be performed by one print head 24*a*.

A print head in which the nozzles 24*b* are arranged in a row is exemplified above as the ink jet print head 24*a*; however, this is by way of example and not limitation. For example, a print head in which the nozzles 24*b* are arranged in a plurality of rows may be used. Further, the print heads 24*a* may be arranged along the conveying direction A1 of the tablets T.

Although the first printing device 20 and the second printing device 30 are described above as being arranged one on top of the other to perform printing on either one or both sides of the tablet T; however, this is by way of example and not limitation. For example, only the first printing device may be provided to perform printing only on one side of the tablet T.

In the above description, there are provided the three drying devices 26, 36, and 42*c*; however, this is by way of example and not limitation, and the number of the drying devices is not limited. That is, at least one drying device may suffice. For example, drying may be performed by the two drying devices 36 and 42*c* without the drying device 26. Drying may also be performed by only the drying device 42*c* without the two drying devices 26 and 36, or by the drying devices 26 and 36 without the drying device 42*c*. There may also be cases where no drying device is required depending on the type of ink or tablets. In that case, all of the three drying devices 26, 36, and 42*c* may be eliminated.

Further, a plurality of receiving members 70 each having the receiving surface M1 for receiving the falling tablets T (see FIG. 4) may be provided so as to sandwich the conveyor belt 21*a* in a direction crossing the conveying paths in which the tablets T are conveyed while being sucked from below in the conveying device 21 in the horizontal plane (for example, a direction perpendicular to the conveying paths). In the conveying device 21, the tablets T may drop even from the conveyor belt 21*a* which conveys the tablets T as sucking them from below. For example, when a guide member for horizontally moving the tablets T is arranged on the upstream of the print head device 24 in the conveying direction A1 to align the tablets T, the tablets T may sometimes be displaced from the conveying path and fall from the upper surface of the conveyor belt 21*a*. The receiving members 70 have the function of receiving the falling tablets T. Accordingly, the receiving members 70 may be arranged in a place where the tablets T can fall from the upper surface of the conveyor belt 21*a*, and the size thereof is not particularly limited. Similarly to the rectifying board 14, the receiving surface M1 can have a gas permeability. Incidentally, the receiving members 70 may also be provided to the conveying path where the tablets T are conveyed as being sucked from below in the conveying device 31. Further, the receiving members 70 may be arranged over the entire upper surface of the conveyor belt 21*a*, and the size thereof is not particularly limited.

The above-described tablets may include tablets for pharmaceutical use, edible use, cleaning, industrial use, and aromatic use. Examples of the tablets include plain tablets (uncoated tablets), sugar-coated tablets, film-coated tablets, enteric coated tablets, gelatin coated tablets, multilayered tablets, dry-coated tablets, and the like. Examples of the tablets further include various capsule tablets such as hard capsules and soft capsules. The tablets may be in a variety of shapes such as, for example, a disk shape, a lens shape, a triangle shape, an oval shape, and the like. In the case where tablets to be printed are for pharmaceutical use or edible use, edible ink is suitably used. As the edible ink, any of synthetic dye ink, natural color ink, dye ink, and pigment ink may be used.

While certain embodiments have been described, these embodiments have been presented by way of example only, and are not intended to limit the scope of the inventions. Indeed, the novel embodiments described herein may be embodied in a variety of other forms; further, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tablet printing apparatus performing printing by using an inkjet print head device for a tablet conveyed by a conveying device, wherein
   the conveying device includes
      a conveyor belt having a plurality of suction holes and configured to convey the tablet while sucking and holding the tablet by any of the suction holes, and a rectifying board having a gas permeability and arranged so that an airflow flowing toward any of the suction holes can pass through the rectifying board, and the rectifying board is arranged opposite to the conveyor belt across the tablet conveyed by the conveyor belt at a distance from the conveyor belt so as to face a surface of the conveyor belt.

2. The tablet printing apparatus according to claim 1, wherein the rectifying board is arranged to face a curved surface of the conveyor belt.

3. The tablet printing apparatus according to claim 1, wherein the rectifying board includes a receiving surface configured to receive a tablet falling from the surface of the conveyor belt.

4. The tablet printing apparatus according to claim 1, further comprising a housing arranged at a distance from the conveyor belt so as to face the surface of the conveyor belt, and configured to house the print head device, wherein the rectifying board is arranged relative to the housing so as to be located outside the housing.

5. The tablet printing apparatus according to claim 1, further comprising:

a supply device configured to supply the tablet;

a first printing device configured to perform printing on the tablet supplied by the supply device;

a second printing device configured to perform printing on the tablet supplied by the supply device; and a collecting device configured to collect the tablet having undergone the printing by either one or both of the first printing device and the second printing device, wherein the supply device, the first printing device, and the second printing device include the conveyor belt, and the first printing device and the second printing device include the print head device.

6. The tablet printing apparatus according to claim 1, wherein the rectifying board includes a plurality of through holes, and is arranged horizontally.

7. The tablet printing apparatus according to claim 1, wherein the rectifying board includes a plurality of through holes, and is arranged to be inclined to a horizontal direction.

8. The tablet printing apparatus according to claim 1, further comprising a plurality of rectifying boards arranged so as to sandwich a space between an upper surface of the rectifying board and a lower surface of the conveyor belt, the rectifying boards each having a gas permeability and arranged so that an airflow flowing toward any of the suction holes can pass through the rectifying boards.

9. The tablet printing apparatus according to claim 1, wherein gas permeability volume of the rectifying board is variable.

10. A tablet printing apparatus performing printing by using an inkjet print head device for a tablet conveyed by a conveying device, wherein the conveying device includes a conveyor belt having a plurality of suction holes and configured to convey the tablet while sucking and holding the tablet by any of the suction holes, and a rectifying board having a gas permeability and arranged so that an airflow flowing toward any of the suction holes can pass through the rectifying board, and the rectifying board is arranged to face the conveyor belt configured to convey the tablet by sucking the tablet from above.

11. The tablet printing apparatus according to claim 10, wherein the rectifying board includes a receiving surface configured to receive a tablet falling from the surface of the conveyor belt.

* * * * *